United States Patent [19]
Applegate

[11] 3,771,824
[45] Nov. 13, 1973

[54] VEHICLE BUMPER

[76] Inventor: Lindsay M. Applegate, 7045 Molokai Drive, Paradise, Calif. 95969

[22] Filed: Feb. 14, 1972

[21] Appl. No.: 225,724

[52] U.S. Cl. ................................................. 293/84
[51] Int. Cl. ............................................ B60r 19/04
[58] Field of Search ..................................... 293/84

[56] References Cited
UNITED STATES PATENTS

| 1,386,452 | 8/1921 | Dotzer et al. | 293/84 |
| 1,777,342 | 10/1930 | Williams | 293/84 |
| 1,792,157 | 2/1931 | Franke | 293/84 |
| 1,435,100 | 11/1922 | Bilterman et al. | 293/84 |
| 1,497,653 | 6/1924 | Coote | 293/84 |

Primary Examiner—Gerald M. Forlenza
Assistant Examiner—Robert Saifer

[57] ABSTRACT

A vehicular bumper comprising means for absorbing impacts by a combination of springs and hydraulic energy absorption activated by mechanical linkage that increases the rate of energy absorption and resistance to impact as functions of the displacement of the bumper relative to the vehicle.

3 Claims, 1 Drawing Figure

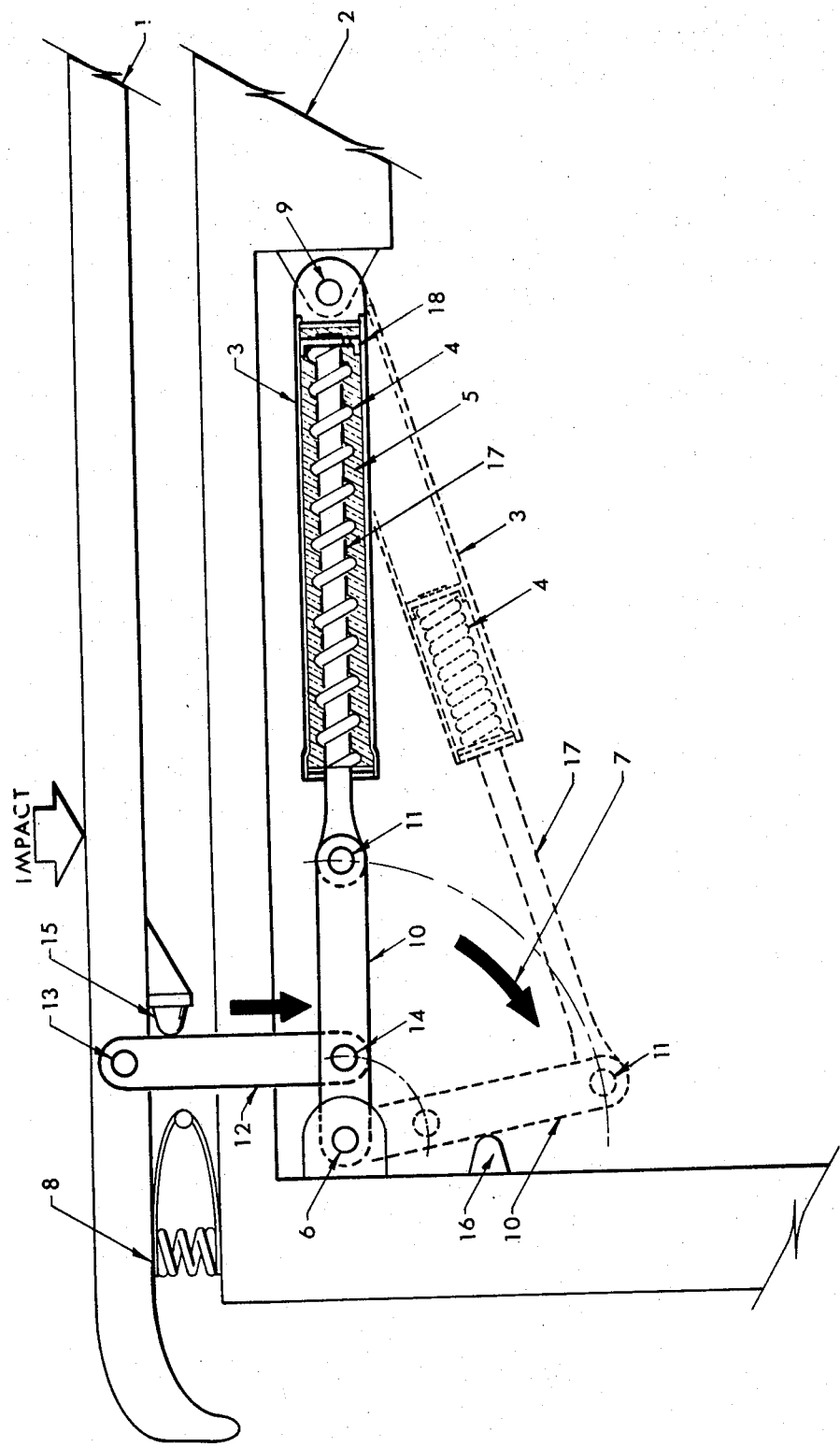

VEHICLE BUMPER

This invention is concerned with the front and rear protective members of vehicles subject to impact with other vehicles or obstacles. There have been many different forms of front and rear vehicle bumpers capable of absorbing some of the energy of impact and thereby protecting the vehicle to some extent from damage. The majority of bumpers on vehicles have been attached to the frames of the vehicles with means ranging from solid bolting to some form of spring or other flexible means capable of absorbing some energy.

Some of the bumpers presently provided on automobiles and trucks are solidly bolted to the vehicle frames, or attached by means with a small degree of spring or flexibility. A solid mounting absorbs practically no energy and transmits the energy of impact to the vehicle frame. A spring support incurs deflection in impact converting kinetic energy to potential energy which is transmitted to the vehicle frame and which eases the force of impact on the vehicle. If the flexible mounting of the bumper incorporates an energy conversion and absorption member, some of the energy of impact can be converted to heat and the total energy transmitted to the vehicle frame is thereby decreased. Motor vehicles have been provided with hydraulic bumpers in which hydraulic resistance to bumper displacement increases with piston travel. These have had hydraulic cylinders set so that their piston travel is the same as bumper travel and therefore the length of the cylinder is limited to the distance permitted in bumper displacement.

In the design of vehicle bumpers, esthetic requirements, space limitations and cost of manufacture and maintenance are important considerations. The distance provided for movement of the bumper relative to the frame is a dominant factor in the design of mountings and energy-absorbing means that may be involved. In the prior art there are bumper systems with transverse shock-absorbing elements intended to economize space lengthwise of vehicles.

The principal object of my present invention is a vehicle bumper that can absorb energy effectively for the protection of a vehicle in impact with minimum travel space between the bumper and vehicle. A second object is a bumper that will protect a vehicle, be adaptable to esthetic vehicular design and be produced at moderate expense. Another important object is to provide means whereby, in a bumper system, variable rate hydraulic resistance to impact and displacement is controlled by mechanical connections between bumper bars and hydraulic energy absorbers.

What constitutes this invention is described in the following specification with respect to the accompanying drawing and the novel features thereof are succiently defined in the appended claims.

In FIG. 1, which is schematic and only suggestive of scale, and which shows only half of a complete bumper system assemblage, 1 is the bumper proper referred to also as the bumper bar, and for brevity as bumper, the element of the assemblage that receives the impact of a collision. The assemblage is supported on the vehicle frame 2 which may be any conventional form adapted to accommodate the other components of the bumper assemblage.

The principal energy-absorbing element of the system is a hydraulic cylinder 3 attached at the closed end of the cylinder to the frame 2 by a pivoted bracketed joint 9. The cylinder 3 includes a spring 4 and damping fluid 5, together with a piston rod 17, piston 18 and an orifice in the piston for damping effect and energy absorption in response to movement of the piston and rod.

A second pivoted and bracketed joint 6 is provided on the frame to support a mechanical lever 10 pivoted and connected to the outside end 11 of the cylinder piston rod 17.

A spring 8 is provided optionally between the bumper 1 and frame 2. This spring is, in effect, in parallel with the spring 4 in cylinder 3. It is possible to omit either spring 4 or spring 8, relying on only one spring to perform spring function in the bumper operation.

A second mechanical link 12 is connected at a pivoted joint 13 to the bumper 1 and to lever 10 at pivoted joint 14. A rubber, or similar bracketed stop 15 is provided optionally for maintaining lateral positioning and stability relative to frame 1. Either stop 15, or spring 8, particularly if spring 8 includes a leaf spring component, as shown, with inherent capability of lateral stabilization, can contribute to lateral stability, although the leaf spring construction of spring 8 is preferred. Some arrangement for lateral stability is required, inasmuch as link 12 would permit lateral movement of bumper 1 relative to frame 2.

In the operation of this bumper system, an impact on bumper 1 compresses spring 8 permitting bumper 1 to move in the direction of, and relative to, frame 2. Link 12 is carried with bumper 1 so that lever 10 is rotated around pivoted pivot 6. The movement of lever 10, being restrained at pivot 6, is in a rotational path in which the outside end 11 of the cylinder piston rod 17 is carried by lever 10 in a circular path indicated by the arrow 7. A second rubber or similar stop 16 is provided optionally to limit the maximum travel of lever 10. In FIG. 1 the relative positions of cylinder 3, lever 10 and the associated elements 3, 4 and 17 are shown by broken lines illustrative of their positions when bumper 1 is in the rearward location after impact.

The movement of bumper 1 relative to frame 2 is resisted by spring 8 which stores energy and decreases the impact transmitted to frame 2 but returns to stored energy to the system after the impact has subsided. So simiarly, spring 4 in cylinder 3 stores and returns energy of impact. These springs act to restore the bumper and the associated parts of the system to their original positions after impact.

Link 12, following impact on bumper 1, moves rearward with a velocity determined by the force of impact and resistance offered by cylinder 3. Lever 10 rotates about pivot 6 at a velocity determined by the velocity of link 12. This rotational velocity may be relatively high and pivot 11, connecting lever 10 to piston rod 17, will be impelled at a velocity in the circular path shown in FIG. 1 determined in part by the ratio of distance from pivot 6 to pivot 11, relative to the distance from pivot 6 to pivot 14. The relative velocity of piston rod 17 in cylinder 3, however, beginning at impact with lever 10 colinear with piston rod 17 is relatively low, functionally approximating the product of the anguar velocity and length of lever 10 and the tangent of the angle through which lever 10 has rotated from the initial position colinear with piston rod 17. Thus in displacement from original position, the velocity of piston rod 17 and piston 18 in cylinder 3 increases as a function of angular position of lever 10 and linear velocity of link 12 and bumper 1. The increased velocity of piston 18 with a fixed orifice for flow of hydraulic fluid 5 increases the hydraulic resistance to the movement of bumper 1 as a function of distance and velocity in displacement of bumper 1 from original position. The result is that the hydraulic resistance to bumper impact is relatively low initially but increases rapidly in resistance and energy absorption as the bumper bar 1 is forced toward the vehicle frame 2. The desire in impact control is to resist the force of impact gradually so that frame 2 incurs minimum force while the movement of bumper 1 is arrested and stopped within a reasonable distance prior to impact impingement of bumper 1 on frame 2. The circular motion of lever 10 begins at a point where lever 10 is colinear with the axis of piston rod 17, hence accelerates piston rod 17 at a rate starting at zero and increasing as link 10 is rotated until lever 10 has rotated nearly 90 degrees as shown in the broken lines in FIG. 1 when the piston rod will will be pulled at maximum velocity and consequently at maximum hydraulic resistance in fluid 5 in cylinder 3. This piston movement at increasing velocity with corresponding increasing resistance will arrest the movement of bumper 1 gradually with increasing force while absorbing energy in cylinder 3 where the energy of impact is converted to heat through the medium of fluid friction. That is to say, the impact on bumper 1 is absorbed and decelerated gradually.

There are several advantages of the construction shown in FIG. 1 compared with alternative arrangements such as a cylinder connected to the bumper so that the piston movement would be the same as that of the bumper relative to the frame. In FIG. 1 a relatively long hydraulic cylinder comparable in shape and dimensions with conventional automotive shock absorbers can be used. The linkage comprising lever 10 and link 12 translates a short movement of bumper 1 relative to frame 2 into a much greater movement of piston 17. For example, if it were required to restrict the movement of bumper 1 to a limit of 5 cm relative to frame 2, lever 10, if made 20 cm long, with the distance between the pivot at 6 and the pivot at 14 set at 5 cm, the piston 17 would be moved more than four times the travel permitted between bumper 1 and frame 2. This provides for more readily controlled hydraulic resistance than in a short cylinder. Another advantage is that the increasing velocity of piston 17 progressively increases hydraulic resistance as a function of displacement of bumper 1 relative to frame 2 and this substitutes velocity control for throttling control as would be required for a short cylinder whose piston movement would be directly the same as the movement of bumper 1 relative to frame 2. Another advantage of the construction shown in FIG. 1 is that the transverse positioning of cylinder 3 in the vehicle frame permits the use of a long cylinder more readily than if a longitudinal emplacement were used. The arrangement shown can be designed so that a minimum of space at the front or rear of a vehicle will accommodate the assemblage.

It will be apparent to those skilled in this art that the fundamental principles principles employed in this invention includes the increase of resistance developed by increase of velocity at a rate determined by appropriate relative movements and dimensions of the system components. Design details that retain the basic principles of operation of the system will be apparent, such as reversal of the cylinder 3 limiting the system to a single cylinder with attachment at the middle of bumper 1 instead of using two assemblages as implied in FIG. 1, and other details of design, are feasible in the adaptation of the principle to various arrangements of vehicular construction.

In the wording of this specification and of the claims "a hydraulic damper" means cylinder 3, fluid 5, and the associated operational parts. "An energy absorbing medium" means fluid 5 in conjunction with piston 18 in cylinder 3. "Vehicle bumper" means the system as described in FIG. 1. "Bumper bar" means bumper 1 as indicated in FIG. 1. In describing the mechanical action of bumper bar 1, link 12, lever 10, piston rod 17 and cylinder 3, the trigonometric relationship of the several parts is useful. If bumper bar 1 is moved toward frame 2 at a uniform speed, link 12 is moved also at uniform speed. The end of link 12 moves at pivot 14 in a circular arc of relatively small radius. Lever 10 at pivot 14 also travels in the same small circular arc, but the outer end of lever 10 at pivot 11 travels in the circular arc of greater radius indicated by the arrow in FIG. 1, ultimately to the final position indicated by the broken lines. The velocity of rotation of lever 10 is increased as bumper 1 and link 12 are forced in the direction of frame 2 assuming uniform velocity of bumper 1. The end of piston rod 17 at pivot 11 starts, relative to cylinder 3, at zero speed inasmuch as lever 10 and rod 17 are colinear, and, assuming constant velocity of bumper 1, the speed of rod 17 relative to cylinder 3 is accelerated approximately in proportion to the trigonometric tangent of the angle through which lever 10 has become displaced from the original colinear position shown in solid lines in FIG. 1. The speed of piston rod 17 and piston 18 in cylinder 3 is approximately the product of the linear velocity of bumper bar 1 and the tangent of the angle through which lever 10 has moved from the initial position. The degree of approximation of the actual speeds and displacements to the mathematical is precise at zero displacement but decreases as the displacement increases, due to the angular rotation of cylinder 3 about pivot 9 and to the necessary departure of mechanical parts from mathematical lines.

I claim:

1. A vehicle bumper system comprising a bumper bar supported on a vehicle frame and adapted to be displaced upon impact toward said frame, a link pivotally connected at one end to said bumper bar and at the other end to a lever pivoted at one end on said vehicle frame and at the opposite end to the piston of a hydraulic damper cylinder pivoted at the end of said cylinder to said vehicle frame, said link being connected to said lever between the middle of said lever and the pivot of said lever to said frame, whereby in operation said lever is initially substantially parallel to said bumper bar and perpendicular to said link and colinear with said piston and cylinder, and upon impact and movement of said bumper bar said lever is rotated about said pivot to frame imparting movement to said piston relative to said cylinder at an accelerating rate as said bumper bar is moved toward said vehicle frame.

2. In a vehicle bumper, the combination of a bumper bar, a link connected perpendicular thereto and connected to a lever substantially parallel to said bumper bar pivoted at one end on the vehicle frame and at the other end to the piston of a hydraulic damper cylinder, said link being connected to said lever between the middle thereof and said pivot on said vehicle frame, whereby displacement of said bumper bar relative to said vehicle frame rotates said lever at an angular rate which increases with increased bumper bar displacement thereby actuating said hydraulic damper relatively slowly when said bumper displacement begins and increasing the rate of hydraulic damping as a function of bumper displacement at any rate of increase of bumper displacement.

3. In a vehicle bumper, a bumper bar, a lever pivoted at one end on the vehicle frame and at the other end to the piston rod of a hydraulic cylinder pivotally connected, at the end opposite the piston rod, to said vehicle frame, and a link connecting said bumper bar to said lever between the middle thereof and the end pivoted on said vehicle frame, whereby displacement of said bumper bar relative to said frame rotates said lever around the pivot on said vehicle frame producing a displacement in said hydraulic cylinder which increases at a rate which is approximately determined by the product of said displacement of said bumper bar and the tangent of the angle of displacement of said lever.

* * * * *